(12) United States Patent
Gurvich et al.

(10) Patent No.: US 10,592,780 B2
(45) Date of Patent: Mar. 17, 2020

(54) NEURAL NETWORK TRAINING SYSTEM

(71) Applicant: FRINGEFY LTD., Ramat Gan (IL)

(72) Inventors: Roni Gurvich, Tel Aviv (IL); Idan Ilan, Tel Aviv (IL); Ofer Avni, Nes Ziona (IL); Stav Yagev, Tel Aviv (IL)

(73) Assignee: WHITE RAVEN LTD., Ramat Gan (IL)

( * ) Notice: Subject to any disclaimer, the term of this patent is extended or adjusted under 35 U.S.C. 154(b) by 28 days.

(21) Appl. No.: 15/942,226

(22) Filed: Mar. 30, 2018

(65) Prior Publication Data

US 2019/0303725 A1      Oct. 3, 2019

(51) Int. Cl.
*G06K 9/00*      (2006.01)
*G06K 9/62*      (2006.01)
*G06N 3/08*      (2006.01)

(52) U.S. Cl.
CPC ......... *G06K 9/6262* (2013.01); *G06K 9/6232* (2013.01); *G06K 9/6256* (2013.01); *G06N 3/084* (2013.01)

(58) Field of Classification Search
CPC .......... G06K 9/66; G06K 9/4628; G06K 9/32; G06K 9/2013; G06K 9/344; G06K 9/6255; G06K 9/6216; G06K 9/00228; G06K 9/6262; G06K 9/6232; G06F 17/30249
See application file for complete search history.

(56) References Cited

U.S. PATENT DOCUMENTS

| 6,711,293 | B1 | 3/2004 | Lowe |
| 7,054,850 | B2 * | 5/2006 | Matsugu ............ G06K 9/00973 |
| | | | 706/48 |
| 7,903,899 | B2 | 3/2011 | Sharon et al. |
| 7,920,748 | B2 | 4/2011 | Sharon et al. |

(Continued)

OTHER PUBLICATIONS 3D city models. Retrieved Mar. 15, 2018, from https://en.wikipedia.org/wiki/3D_city_models.

(Continued)

*Primary Examiner* — Amir Alavi
(74) *Attorney, Agent, or Firm* — Ungerman IP PLLC; Mark Ungerman

(57) ABSTRACT

In order for the feature extractors to operate with sufficient accuracy, a high degree of training is required. In this situation, a neural network implementing the feature extractor may be trained by providing it with images having known correspondence. A 3D model of a city may be utilized in order to train a neural network for location detection. 3D models are sophisticated and allow manipulation of viewer perspective and ambient features such as day/night sky variations, weather variations, and occlusion placement. Various manipulations may be executed in order to generate vast numbers of image pairs having known correspondence despite having variations. These image pairs with known correspondence may be utilized to train the neural network to be able to generate feature maps from query images and identify correspondence between query image feature maps and reference feature maps. This training can be accomplished without requiring the capture of real images with known correspondence. Capture of real images with known correspondence is cumbersome, time and resource-intensive, and difficult to manage.

14 Claims, 3 Drawing Sheets

(56) References Cited

U.S. PATENT DOCUMENTS

| | | | |
|---|---|---|---|
| 8,345,984 B2* | 1/2013 | Ji | G06K 9/00335 |
| | | | 382/190 |
| 9,076,078 B2* | 7/2015 | Miyashita | G06K 9/6256 |
| 9,881,234 B2* | 1/2018 | Huang | G06K 9/6232 |
| 10,043,097 B2* | 8/2018 | Yagev | G06K 9/00704 |
| 10,095,957 B2* | 10/2018 | Kulkarni | G06K 9/6218 |
| 10,282,589 B2* | 5/2019 | Mesmakhosroshahi | |
| | | | G06K 9/0014 |
| 10,296,815 B2* | 5/2019 | Wolf | G06T 7/70 |
| 2010/0045678 A1* | 2/2010 | Reid | G06T 13/00 |
| | | | 345/427 |
| 2012/0321175 A1 | 12/2012 | Hedau et al. | |

OTHER PUBLICATIONS

Blaschke, T., Hay, G., Kelly, M., Lang, S., Hofmann, P., Addink, E., Feitosa, R.Q., Van Der Meer, F., Van Der Werff, H., Van Coillie, F. & Tiede, D., Geographic Object-Based Image Analysis—Towards a new paradigm. (Jul. 12, 2012). Department of Geoinformatics—Z_GIS, University of Salzburg, Salzburg, Austria. ISPRS Journal of Photogrammetry and Remote Sensing. Jan. 2014, 87, pp. 180-191. Retrieved Feb. 23, 2015, from http://www.ncbi.nlm.nih.gov/pmc/articles/PMC3945831/?report=printable, Elsevier B.V.

Chen, Z., Lam, O., Jacobson, A., and Milford, M., Convolutional Neural Network-based Place Recognition. 2014. ARC Centre of Excellence for Robotic Vision, Queensland University of Technology. Australia.

Computer vision. Retrieved Feb. 23, 2015, from https://en.wikipedia.org/wiki/Computer_vision.

Deep learning. Retrieved Mar. 15, 2018, from https://en.wikipedia.org/wiki/Deep_learning.

Dollner, J, Baumann, K., Buchholz, H., Virtual 3D City Models as Foundations of Complex Urban Information Spaces. (Feb. 13, 2006). Corp 2006 and Geomultimedia06 Sustainable Solutions for the Information Society—11th International Conference on Urban Planning and Spatial Development for the Information Society, Vienna, Austria., pp. 108-112.

Geographic information system_ Retrieved Feb. 23, 2015, from https://en.wikipedia.org/wiki/Geographic_information_system.

GIS applications. Retrieved Feb. 23, 2015, from https://en.wikipedia.org/wiki/GIS_applications.

Image analysis. Retrieved Feb. 23, 2015, from https://en.wikipedia.org/wiki/Image_analysis.

Image processing. Retrieved Feb. 23, 2015, from https://en.wikipediaorg/wiki/Image_processing.

Machine learning. Retrieved Mar. 15, 2018, from https://en.wikipedia.org/wiki/Machine_learning.

Supervised learning. Retrieved Mar. 15, 2018, from https://en.wikipedia.org/wiki/Supervised_learning.

TensorFlow. Retrieved Mar. 15, 2018, from https://en.wikipedia.org/wiki/TensorFlow.

* cited by examiner

NEURAL NETWORK TRAINING SYSTEM

BACKGROUND OF THE INVENTION

1. Field of the Invention

The invention relates to image-based location identification and more particularly to training neural networks for this task.

2. Description of the Related Technology

Computer vision is a field that includes methods for acquiring, processing, analyzing, and understanding images and, in general, high-dimensional data from the real world in order to produce numerical or symbolic information, e.g., in the forms of decisions. A theme in the development of this field has been to duplicate the abilities of human vision by electronically perceiving and understanding an image. This image understanding can be seen as the disentangling of symbolic information from image data using models constructed with the aid of geometry, physics, statistics, and learning theory. Computer vision has also been described as the enterprise of automating and integrating a wide range of processes and representations for vision perception.

As a scientific discipline, computer vision is concerned with the theory behind artificial systems that extract information from images. The image data can take many forms, such as video sequences, views from multiple cameras, or multi-dimensional data from a medical scanner. As a technological discipline, computer vision seeks to apply its theories and models to the construction of computer vision systems.

Sub-domains of computer vision include scene reconstruction, event detection, video tracking, object recognition, object pose estimation, learning, indexing, motion estimation, and image restoration.

In imaging science, image processing is any form of signal processing for which the input is an image, such as a photograph or video frame; the output of image processing may be either an image or a set of characteristics or parameters related to the image. Most image-processing techniques involve treating the image as a two-dimensional signal and applying standard signal-processing techniques to it.

Image processing usually refers to digital image processing, but optical and analog image processing also are possible. The acquisition of images (producing the data representative of an image in the first place) is referred to as imaging.

Closely related to image processing are computer graphics and computer vision. In computer graphics, images are manually made from physical models of objects, environments, and lighting, instead of being acquired (via imaging devices such as cameras) from natural scenes, as in most animated movies. Computer vision, on the other hand, is often considered high-level image processing out of which a machine/computer/software intends to decipher the physical contents of an image or a sequence of images (e.g., videos or 3D full-body magnetic resonance scans).

In modern sciences and technologies, images also gain much broader scopes due to the importance of scientific visualization (of often large-scale complex scientific/experimental data). Examples include microarray data in genetic research, or real-time multi-asset portfolio trading in finance.

Image analysis is the extraction of meaningful information from images; mainly from digital images by means of digital image processing techniques. Image analysis tasks can be as simple as reading bar coded tags or as sophisticated as identifying a person from their face.

Computers are indispensable for the analysis of large amounts of data, for tasks that require complex computation, or for the extraction of quantitative information. On the other hand, the human visual cortex is an excellent image analysis apparatus, especially for extracting higher-level information, and for many applications, including medicine, security, and remote sensing, human analysts still cannot be replaced by computers. For this reason, many important image analysis tools such as edge detectors and neural networks are inspired by human visual perception models.

Computer Image Analysis makes heavy use of pattern recognition, digital geometry, and signal processing.

It is the quantitative or qualitative characterization of two-dimensional (2D) or three-dimensional (3D) digital images. 2D images are, for example, to be analyzed in computer vision, and 3D images in medical imaging.

There are many different techniques used in automatically analyzing images. Each technique may be useful for a small range of tasks, however there still aren't any known methods of image analysis that are generic enough for wide ranges of tasks, compared to the abilities of a human's image analyzing capabilities. Examples of image analysis techniques in different fields include:

2D and 3D object recognition
image segmentation
motion detection, e.g., single particle tracking
video tracking
optical flow
medical scan analysis
3D Pose Estimation
automatic number plate recognition.

Digital Image Analysis is when a computer or electrical device automatically studies an image to obtain useful information from it. Note that the device is often a computer but may also be an electrical circuit, a digital camera or a mobile phone. The applications of digital image analysis are continuously expanding through all areas of science and industry, including:

medicine, such as detecting cancer in an MRI scan
microscopy, such as counting the germs in a swab
remote sensing, such as detecting intruders in a house, and producing land cover/land use maps
astronomy, such as calculating the size of a planet
materials science, such as determining if a metal weld has cracks
machine vision, such as to automatically count items in a factory conveyor belt
security, such as detecting a person's eye color or hair color
robotics, such as to avoid steering into an obstacle
optical character recognition, such as automatic license plate detection
assay micro plate reading, such as detecting where a chemical was manufactured
metallography, such as determining the mineral content of a rock sample
defense
filtering.

Object-Based Image Analysis (OBIA)—also Geographic Object-Based Image Analysis (GEOBIA)—"is a sub-discipline of geoinformation science devoted to partitioning remote sensing (RS) imagery into meaningful image-objects, and assessing their characteristics through spatial, spectral and temporal scale".

The two main processes in OBIA are (1) segmentation and (2) classification. Traditional image segmentation is on a per-pixel basis. However, OBIA groups pixels into homogeneous objects. These objects can have different shapes and scale. Objects also have statistics associated with them which can be used to classify objects. Statistics can include geometry, context and texture of image objects.

A geographic information system (GIS) is a system designed to capture, store, manipulate, analyze, manage, and present spatial or geographical data. The acronym GIS is sometimes used for geographical information science or geospatial information studies to refer to the academic discipline or career of working with geographic information systems and is a large domain within the broader academic discipline of Geoinformatics.

In a general sense, the term describes any information system that integrates, stores, edits, analyzes, shares, and displays geographic information. GIS applications are tools that allow users to create interactive queries (user-created searches), analyze spatial information, edit data in maps, and present the results of all these operations. Geographic information science is the science underlying geographic concepts, applications, and systems.

GIS has many applications related to engineering, planning, management, transport/logistics, insurance, telecommunications, and business. For that reason, GIS and location intelligence applications can be the foundation for many location-enabled services that rely on analysis and visualization.

GIS can relate unrelated information by using location as the key index variable. Locations or extents in the Earth space-time may be recorded as dates/times of occurrence, and x, y, and z coordinates representing, longitude, latitude, and elevation, respectively. All Earth-based spatial-temporal location and extent references should, ideally, be relatable to one another and ultimately to a "real" physical location or extent. This key characteristic of GIS has begun to open new avenues of scientific inquiry.

Modern GIS technologies use digital information, for which various digitized data creation methods are used. The most common method of data creation is digitization, where a hard copy map or survey plan is transferred into a digital medium through the use of a CAD program, and geo-referencing capabilities. With the wide availability of ortho-rectified imagery (both from satellite and aerial sources), heads-up digitizing is becoming the main avenue through which geographic data is extracted. Heads-up digitizing involves the tracing of geographic data directly on top of the aerial imagery instead of by the traditional method of tracing the geographic form on a separate digitizing tablet (heads-down digitizing).

GIS uses spatio-temporal (space-time) location as the key index variable for all other information. Just as a relational database containing text or numbers can relate many different tables using common key index variables, GIS can relate otherwise unrelated information by using location as the key index variable. The key is the location and/or extent in space-time.

Any variable that can be located spatially, and increasingly also temporally, can be referenced using a GIS. Locations or extents in Earth space-time may be recorded as dates/times of occurrence, and x, y, and z coordinates representing, longitude, latitude, and elevation, respectively. These GIS coordinates may represent other quantified systems of temporo-spatial reference (for example, film frame number, stream gage station, highway mile-marker, surveyor benchmark, building address, street intersection, entrance gate, water depth sounding, POS or CAD drawing origin/units). Units applied to recorded temporal-spatial data can vary widely (even when using exactly the same data, see map projections), but all Earth-based spatial-temporal location and extent references should, ideally, be relatable to one another and ultimately to a "real" physical location or extent in space-time.

Related by accurate spatial information, an incredible variety of real-world and projected past or future data can be analyzed, interpreted and represented.

GIS accuracy depends upon source data, and how it is encoded to be data referenced. Land surveyors have been able to provide a high level of positional accuracy utilizing the GPS-derived positions. High-resolution digital terrain and aerial imagery, powerful computers and Web technology are changing the quality, utility, and expectations of GIS to serve society on a grand scale, but nevertheless there are other source data that have an impact on overall GIS accuracy like paper maps, though these may be of limited use in achieving the desired accuracy since the aging of maps affects their dimensional stability.

The scale of a map and geographical rendering area representation type are very important aspects since the information content depends mainly on the scale set and resulting locatability of the map's representations. In order to digitize a map, the map has to be checked within theoretical dimensions, then scanned into a raster format, and resulting raster data has to be given a theoretical dimension by a rubber sheeting/warping technology process.

A quantitative analysis of maps brings accuracy issues into focus. The electronic and other equipment used to make measurements for GIS is far more precise than the machines of conventional map analysis. All geographical data are inherently inaccurate, and these inaccuracies will propagate through GIS operations in ways that are difficult to predict.

GIS data represents real objects (such as roads, land use, elevation, trees, waterways, etc.) with digital data determining the mix. Real objects can be divided into two abstractions: discrete objects (e.g., a house) and continuous fields (such as rainfall amount, or elevations). Traditionally, there are two broad methods used to store data in a GIS for both kinds of abstractions mapping references: raster images and vector. Points, lines, and polygons are the stuff of mapped location attribute references. A new hybrid method of storing data is that of identifying point clouds, which combine three-dimensional points with RGB information at each point, returning a "3D color image". GIS thematic maps then are becoming more and more realistically visually descriptive of what they set out to show or determine.

Example of hardware for mapping (GPS and laser rangefinder) and data collection (rugged computer). The current trend for geographical information system (GIS) is that accurate mapping and data analysis are completed while in the field. Depicted hardware (field-map technology) is used mainly for forest inventories, monitoring and mapping.

Data capture—entering information into the system—consumes much of the time of GIS practitioners. There are a variety of methods used to enter data into a GIS where it is stored in a digital format.

Existing data printed on paper or PET film maps can be digitized or scanned to produce digital data. A digitizer produces vector data as an operator traces points, lines, and polygon boundaries from a map. Scanning a map results in raster data that could be further processed to produce vector data.

Survey data can be directly entered into a GIS from digital data collection systems on survey instruments using a technique called coordinate geometry (COGO). Positions from a global navigation satellite system (GNSS) like Global Positioning System can also be collected and then imported into a GIS. A current trend in data collection gives users the ability to utilize field computers with the ability to edit live data using wireless connections or disconnected editing sessions. This has been enhanced by the availability of low-cost mapping-grade GPS units with decimeter accuracy in real time. This eliminates the need to post process, import, and update the data in the office after fieldwork has been collected. This includes the ability to incorporate positions collected using a laser rangefinder. New technologies also allow users to create maps as well as analysis directly in the field, making projects more efficient and mapping more accurate.

Remotely sensed data also plays an important role in data collection and consist of sensors attached to a platform. Sensors include cameras, digital scanners and LIDAR, while platforms may consist of aircraft and satellites. With the development of miniature UAVs, aerial data collection is becoming possible at much lower costs, and on a more frequent basis. For example, the Aeryon Scout was used to map a 50-acre area with a Ground sample distance of 1 inch (2.54 cm) in only 12 minutes.

The digital data may come from photo interpretation of aerial photographs. Soft-copy workstations are used to digitize features directly from stereo pairs of digital photographs. These systems allow data to be captured in two and three dimensions, with elevations measured directly from a stereo pair using principles of photogrammetry. Analog aerial photos must be scanned before being entered into a soft-copy system, for high-quality digital cameras this step is skipped.

Satellite remote sensing provides another important source of spatial data. Here satellites use different sensor packages to passively measure the reflectance from parts of the electromagnetic spectrum or radio waves that were sent out from an active sensor such as radar. Remote sensing collects raster data that can be further processed using different bands to identify objects and classes of interest, such as land cover.

When data is captured, the user should consider if the data should be captured with either a relative accuracy or absolute accuracy, since this could not only influence how information will be interpreted but also the cost of data capture.

After entering data into a GIS, the data usually requires editing, to remove errors, or further processing. For vector data it must be made "topologically correct" before it can be used for some advanced analysis. For example, in a road network, lines must connect with nodes at an intersection. Errors such as undershoots and overshoots must also be removed. For scanned maps, blemishes on the source map may need to be removed from the resulting raster. For example, a fleck of dirt might connect two lines that should not be connected.

Data restructuring can be performed by a GIS to convert data into different formats. For example, a GIS may be used to convert a satellite image map to a vector structure by generating lines around all cells with the same classification, while determining the cell spatial relationships, such as adjacency or inclusion.

More advanced data processing can occur with image processing, a technique developed in the late 1960 s by NASA and the private sector to provide contrast enhancement, false color rendering and a variety of other techniques including use of two dimensional Fourier transforms. Since digital data is collected and stored in various ways, the two data sources may not be entirely compatible. So a GIS must be able to convert geographic data from one structure to another. In so doing, the implicit assumptions behind different ontologies and classifications require analysis. Object ontologies have gained increasing prominence as a consequence of object-oriented programming and sustained work by Barry Smith and co-workers.

The earth can be represented by various models, each of which may provide a different set of coordinates (e.g., latitude, longitude, elevation) for any given point on the Earth's surface. The simplest model is to assume the earth is a perfect sphere. As more measurements of the earth have accumulated, the models of the earth have become more sophisticated and more accurate. In fact, there are models called datums that apply to different areas of the earth to provide increased accuracy, like NAD83 for U.S. measurements, and the World Geodetic System for worldwide measurements.

Spatial analysis with geographical information system (GIS) GIS spatial analysis is a rapidly changing field, and GIS packages are increasingly including analytical tools as standard built-in facilities, as optional toolsets, as add-ins or 'analysts'. In many instances these are provided by the original software suppliers (commercial vendors or collaborative non-commercial development teams), whilst in other cases facilities have been developed and are provided by third parties. Furthermore, many products offer software development kits (SDKs), programming languages and language support, scripting facilities and/or special interfaces for developing one's own analytical tools or variants. The increased availability has created a new dimension to business intelligence termed "spatial intelligence" which, when openly delivered via intranet, democratizes access to geographic and social network data. Geospatial intelligence, based on GIS spatial analysis, has also become a key element for security. GIS as a whole can be described as conversion to a sectorial representation or to any other digitization process.

OpenCV (Open Source Computer Vision) is a library of programming functions mainly aimed at real-time computer vision. It is free for use under the open-source BSD license. The library is cross-platform. It focuses mainly on real-time image processing. The library has more than 2500 optimized algorithms, which includes a comprehensive set of both classic and state-of-the-art computer vision and machine learning algorithms. These algorithms can be used to detect and recognize faces, identify objects, classify human actions in videos, track camera movements, track moving objects, extract 3D models of objects, produce 3D point clouds from stereo cameras, stitch images together to produce a high resolution image of an entire scene, find similar images from an image database, remove red eyes from images taken using flash, follow eye movements, recognize scenery and establish markers to overlay it with augmented reality, etc. OpenCV has more than 47 thousand people of user community and estimated number of downloads exceeding 7 million. The library is used extensively in companies, research groups and by governmental bodies. The library is available at www.opencv.org.

U.S. Patent Publication No. 2016/0267326 A1, assigned to the current applicant, shows an image abstraction engine provided to characterize scenes like typically found in an urban setting. In particular to characterize buildings and manmade structures have certain characteristic properties that may be abstracted and compressed in a manner that takes advantage of those characteristic properties. This allows for a more compact and computationally efficient abstraction and recognition.

Conventional "visual search" products (e.g. Google Goggles, CamFind, Cortica.com, etc.) do not attack the specific problem of place recognition. Homesnap, www.homesnap.com recognizes real estate using non-visual sensors. U.S. Patent Publication No. 2012/0321175 A1 shows a mobile device for performing real-time location recognition with assistance from a server. The approximate geophysical location of the mobile device is uploaded to the server. Based on the mobile device's approximate geophysical location, the server responds by sending the mobile device a message comprising a classifier and a set of feature descriptors. This can occur before an image is captured for visual querying. The classifier and feature descriptors are computed during an offline training stage using techniques to minimize computation at query time. Chen, Zetao, et al. "Convolutional Neural Network-based Place Recognition." arXiv preprint arXiv:1411.1509 (2014), the disclosure of which is expressly incorporated herein, proposes to use Convolutional Neural Networks (CNNs) for place recognition technique based on CNN models, by combining features learned by CNNs with a spatial and sequential filter. The CNN described by Chen et al. uses a pre-trained network called Overfeat [Sermanet, et al., 2013] which was originally proposed for the ImageNet Large Scale Visual Recognition Challenge 2013 (ILSVRC2013). The Overfeat network is trained on the ImageNet 2012 dataset, which consists of 1.2 million images and 1000 classes.

Machine learning is a field of computer science that gives computer systems the ability to "learn" (i.e., progressively improve performance on a specific task) with data, without being explicitly programmed. Evolved from the study of pattern recognition and computational learning theory in artificial intelligence, machine learning explores the study and construction of algorithms that can learn from and make predictions on data—such algorithms overcome following strictly static program instructions by making data-driven predictions or decisions, through building a model from sample inputs. Machine learning is employed in a range of computing tasks where designing and programming explicit algorithms with good performance is difficult or infeasible; example applications include email filtering, detection of network intruders or malicious insiders working towards a data breach, optical character recognition (OCR), learning to rank, and computer vision. Effective machine learning is difficult because finding patterns is hard and often not enough training data are available; as a result, machine-learning programs often fail to deliver.

A core objective of a learner is to generalize from its experience. Generalization in the context of machine learning is the ability of a learning machine to perform accurately on new, unseen examples/tasks after having experienced a learning data set. The training examples come from some generally unknown probability distribution (considered representative of the space of occurrences) and the learner must build a general model about this space that enables it to produce sufficiently accurate predictions in new cases. The computational analysis of machine learning algorithms and their performance is a branch of theoretical computer science known as computational learning theory. Because training sets are finite, and the future is uncertain, learning theory usually does not yield guarantees of the performance of algorithms. Instead, probabilistic bounds on the performance are quite common. The bias-variance decomposition is one way to quantify generalization error.

For the best performance in the context of generalization, the complexity of the hypothesis should match the complexity of the function underlying the data. If the hypothesis is less complex than the function, then the model has underfit the data. If the complexity of the model is increased in response, then the training error decreases. But if the hypothesis is too complex, then the model is subject to overfitting and generalization will be poorer. In addition to performance bounds, computational learning theorists study the time complexity and feasibility of learning. In computational learning theory, a computation is considered feasible if it can be done in polynomial time. There are two kinds of time complexity results. Positive results show that a certain class of functions can be learned in polynomial time. Negative results show that certain classes cannot be learned in polynomial time.

An artificial neural network (ANN) learning algorithm, usually called "neural network" (NN), is a learning algorithm that is vaguely inspired by biological neural networks. Computations are structured in terms of an interconnected group of artificial neurons, processing information using a connectionist approach to computation. Modern neural networks are non-linear statistical data modeling tools. They are usually used to model complex relationships between inputs and outputs, to find patterns in data, or to capture the statistical structure in an unknown joint probability distribution between observed variables. The concept of deep learning consists of multiple hidden layers in an artificial neural network. This approach tries to model the way the human brain processes light and sound into vision and hearing. Some successful applications of deep learning are computer vision and speech recognition. Deep learning (also known as deep structured learning or hierarchical learning) is part of a broader family of machine learning methods based on learning data representations, as opposed to task-specific algorithms. Learning can be supervised, semi-supervised or unsupervised. Deep learning may be a class of machine learning algorithms that i) use a cascade of multiple layers of nonlinear processing units for feature extraction and transformation, with each successive layer using the output from the previous layer as input; ii) learn in supervised (e.g., classification) and/or unsupervised (e.g., pattern analysis) manners; and iii) learn multiple levels of representations that correspond to different levels of abstraction; the levels form a hierarchy of concepts. Generally deep learning models are based on an artificial neural network.

Supervised learning is the machine learning task of learning a function that maps an input to an output based on example input-output pairs. It infers a function from labeled training data consisting of a set of training examples. In supervised learning, each example is a pair consisting of an input object (typically a vector) and a desired output value (also called the supervisory signal). A supervised learning algorithm analyzes the training data and produces an inferred function, which can be used for mapping new examples. An optimal scenario will allow for the algorithm to correctly determine the class labels for unseen instances. This requires the learning algorithm to generalize from the training data to unseen situations in a "reasonable" way.

SUMMARY OF THE INVENTION

It is an object to facilitate the use of neural networks for use in location recognition systems. Neural networks require training which may be by deep learning techniques. The Overfeat Neural Network described above, recognized that Deep learning approaches are notoriously computationally-intensive so an examination of real time capability is particular necessary. "The experiments in this paper used the Overfeat network, and feature extraction ran at significantly slower than real-time on a single PC. This can be sped up using a different convolutional architecture such as Caffe, Y. Jia, E. Shelhamer, J. Donahue, S. Karayev, J. Long, R. Girshick, S. Guadarrama, and T. Darrell, 2014] Y. Jia, E. Shelhamer, J. Donahue, S. Karayev, J.

Long, R. Girshick, S. Guadarrama, and T. Darrell, "Caffe: Convolutional Architecture for Fast Feature Embedding," 2014, which may substantially increase speed, but was only expected to be able to process 2.5 images per second." It is an object to provide training to a neural network utilizing deep learning by utilizing a 3D city model.

3D city models are digital models of urban areas that may represent terrain surfaces, sites, buildings, vegetation, infrastructure and landscape elements as well as related objects (e.g., city furniture) belonging to urban areas. Their components may be described and represented by corresponding two-dimensional and three-dimensional spatial data and geo-referenced data. 3D city models may support presentation, exploration, analysis, and management tasks in a large number of different application domains. In particular, 3D city models allow "for visually integrating heterogeneous geoinformation within a single framework and, therefore, create and manage complex urban information spaces." J. Döllner, K. Baumann, H. Buchholz: Virtual 3D City Models as Foundation of Complex Urban Information Spaces. 11th international conference on Urban Planning and Spatial Development in the Information Society (REAL CORP), (Manfred Schrenk, ed.), CORP—Competence Center of Urban and Regional Planning, pp. 107-112, 2006".

It is an object to provide a system with enhanced capabilities of location recognition based on images. The system may be a hybrid system utilizing abstraction in the form of feature extraction and neural network implemented correspondence matching. Particularly a system for abstracting images may be used in a system suitable for indexing and/or identifying points of interest. In a possible application, a user could capture an image of a landmark, building or other point of interest. The system is intended to overcome challenges in recognizing images of such locations. The challenges include reliable identification of a point of interest under significant occlusion and from a range of viewpoints, image sizes, resolution and ambient conditions. An image of a point of interest may be taken from many angles and distances and with varying degrees of magnification. It is intended that all such images of a particular point of interest be recognized as being the same object. For example, an image of a point of interest might be captured from any height accessible by a user's mobile communication device and may be from any direction, possibly up to 360 degrees. The image may be captured from a broad range of distances from the object. Another challenge to image recognition is lighting variations, weather variations, seasonal variations, and objects that may occlude a portion of a landmark (such as trees, pedestrians, cars, etc.) of which will affect the captured image. It is an object to consistently be able to identify a location based on all of these variations in the captured image.

Traditional raster features are not robust enough to overcome the challenges attendant to variations in the outdoor scene. Conventional patch descriptors that describe an encapsulated point require too much time and computational resources for near real-time location recognition in a personal computing device. Outdoor scenes typically require hundreds of point features which make traditional recognition processes impractical in view of the computational performance and communication bandwidth which would otherwise be required. It is one object of the invention to facilitate abstraction, indexing and/or recognition of images and to take advantage of characteristics frequently present in images of locations of interest.

The system provides enhanced abilities particularly applicable to images of building and manmade structures. Images of these objects often include straight lines/line segments and orthogonal elements. Traditional image analysis and abstraction would require bandwidth and computational resources that make useful abstraction and identification with a mobile device, such as current conventional smartphones, camera phones, tablets and PDAs, impractical.

A captured scene may be abstracted in a fashion intended to take advantage of characteristic geometry and structure. One process for characterizing an image is to use feature extraction.

The system may be connected to a database containing reference image extractions feature maps and a neural network specifically trained to identify correspondence between a query input and a reference entry in a database. The correspondence may utilize ray-tracking.

An aspect is the specialized training of the neural network through deep learning. It is particularly challenging to adequately train a neural network for this purpose. Adequate training may be achieved using image pairs having known correspondence. The generation of a sufficient number of such image pairs and pairs known to correspond but which are sufficiently different from each other so as to be effective in training the neural network to identify a reference image with expected difference attributable to expected interference due to a location, orientation, perspective, anticipated occlusions and lighting and weather variation.

A method for training a neural network implementation of a feature extractor and a correspondence matcher may include setting rendering parameters in a 3D model. The rendering parameters may include position orientation. The rendering parameters may also include light level, occlusions, simulated weather, etc. The rendering parameters may be used to generate a 2D rendering from a 3D model. A series of rendering with known variations in rendering parameters are helpful for neural network training. Ray-tracing information of one frame may be used to solve a ground-truth correspondence map of the frame with a second neighbor image. The rendering parameters may be incremented to generate the second neighbor image. The first and second images may be utilized to generate a ground-truth correspondence map or matrix which may be used as a training input to the neural network.

The first and second images may both be processed through a feature extractor to obtain respective feature maps. The two feature maps or matrices may be processed through a correspondence matcher to obtain a correspondence map (designated for clarity as a "feature extraction correspondence map.") The feature extraction correspondence map may be a second training input to the neural network.

A loss function may then be applied to the first and second training inputs to the feature extraction correspondence map and the ground-truth correspondence map. The feature extractor may be updated on the basis of a result of the application of the loss function. The correspondence matcher may also be updated to be consistent with and maintain compatibility with the feature extractor as updated.

The feature extractor may be updated by adjusting the weights of the feature extractor by back propagation.

In addition, the rendering parameters may be updated by modifying orientation. The rendering parameters may be constrained to approximate virtual position and orientations corresponding to a virtual position and orientation consistent with the position and orientation of a forward-looking vehicle camera located on a virtual street of said 3D model. This may enhance the training for the application of in-vehicle location recognition.

The functions described herein may advantageously be performed on a computer system implementing OpenCV or another computer vision library of software solution. The neural net may be in a framework such as provided by TensorFlow, and the training may rely on a 3D city model such as the Unity Game Engine. TensorFlow is an open-source software library for dataflow programming across a range of tasks. It is a symbolic math library and may be used for machine learning applications such as neural networks.

In image processing, feature extraction starts from an initial set of measured data and builds derived values (features) intended to be informative and non-redundant, facilitating the subsequent learning and generalization steps, and in some cases leading to better human interpretations. Feature extraction is related to dimensionality reduction. When the input data to an algorithm is too large to be processed and it is suspected to be redundant (e.g. the same measurement in both feet and meters, or the repetitiveness of images presented as pixels), then it can be transformed into a reduced set of features (also named a feature vector). Determining a subset of the initial features is called feature selection. The selected features are expected to contain the relevant information from the input data, so that the desired task can be performed by using this reduced representation instead of the complete initial data. Feature extraction involves reducing the amount of resources required to describe a large set of data. When performing analysis of complex data one of the major problems stems from the number of variables involved. Analysis with a large number of variables generally requires a large amount of memory and computation power, also it may cause a classification algorithm to overfit to training samples and generalize poorly to new samples. Feature extraction is a general term for methods of constructing combinations of the variables to get around these problems while still describing the data with sufficient accuracy.

Various objects, features, aspects, and advantages of the present invention will become more apparent from the following detailed description of preferred embodiments of the invention, along with the accompanying drawings in which like numerals represent like components.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

DETAILED DESCRIPTION OF THE PREFERRED EMBODIMENT

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention or work of an inventor. Further, the dates of publication provided may be different from the actual publication dates, which may need to be independently confirmed.

Depending on context image as used herein, maybe an optical counterpart of an object or scene or a digital representation of an optical counter of an image or scene.

A specialized visual search engine may be utilized as a location recognition system. The visual search query may be an image of a location, for example, a location in a city. Image-based location recognition in an urban environment presents particular challenges created, in part, by repetitive man-made structures. Man-made structures such as buildings, fences, walls, and other repetitive structures make image differentiation and therefore recognition more challenging. An image-based location recognition system may rely on correspondence between a query image and a reference in order to identify and recognize a location.

Figure 1:
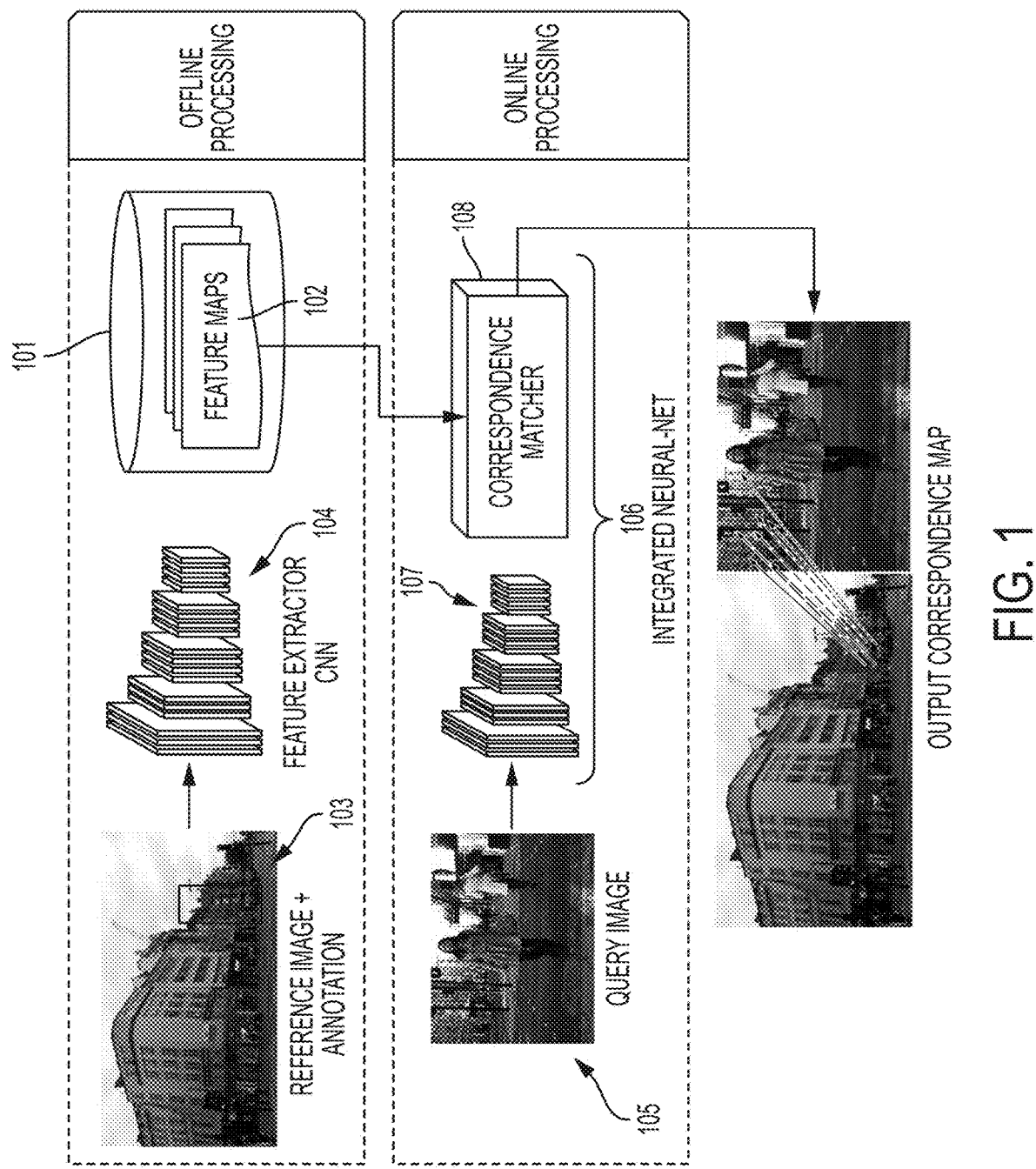
FIG. 1 shows an image-based location recognition system.

FIG. 1 shows an image-based location recognition system. Reference images and metadata 103 may be provided to a feature extractor 104. The feature extractor processes the reference images and generates a plurality of feature vectors, which collectively use feature maps 102 stored in a reference database 101. The establishment of the reference database may be an offline process, but may be supplemented, augmented, or updated over time utilizing the query images. The reference database 101 stores location references in the form of feature maps 102 describing an image of a particular location.

A query image 105 may be captured by any system which would benefit by recognition of a location by an image. A simple use would be a smartphone application which may allow a tourist to photograph a particular location with the intention that the system recognized the location and provides location-based information to the user. Location recognition according to a system as described may be used when other location services are inadequate. GPS-based location services are often not sufficiently responsive or accurate for certain applications. Traditional location services may be utilized to narrow the references in a reference database which may consulted for the location recognition. A query image 105 may be provided to an integrated neural network 106 for recognition. The integrated neural network 106 includes a feature extractor 107. The query image 105 is provided to the feature extractor 107 which generates a query feature map provided to a correspondence matcher 108. The correspondence matcher 108 may be implemented within a neural network 106 in order to identify correspondence between a feature map generated by the feature extractor 107 from a query image 105 to a feature map generated from a reference image. The correspondence matcher 108 may output a correspondence map 109. The output correspondence map 109 reflects a confidence level in the query and reference image correspondence which indicates confidence in a location identification of the query image 105 as the location corresponding to the reference feature map 102.

The system may be maintained or updated by incorporating feature maps derived from actual images captured in the location recognition process into the reference database 101. A location may undergo changes over time. These changes may occur in small increments. The system may operate to recognize accurately a location which includes a small incremental change over the location when input as a reference. Over time, the location may be altered in an amount that is sufficient to defeat the location recognition based on an early reference image. The process of using query image feedback into the reference database 101 enhances the ability of the database to change over time to match changes in locations. Advantageously, very small changes, such as occlusions which may be caused by temporal presence by individuals or vehicles, need not be incorporated into the reference database.

In order for the feature extractors 104, 107 to operate with sufficient accuracy, a high degree of training is required. In this situation, a neural network implementing the feature extractor 104, 107 may be trained by providing it with images having known correspondence. According to an embodiment of the invention, a 3D model of a city may be utilized in order to train the neural network. 3D models have become very sophisticated and allow for manipulation of viewer perspective and ambient features such as day/night sky variations, weather variations, and occlusion placement. Variations in perspective may include observer orientation changes and observer location changes. Variation of occlusions may be by vehicle placement and vehicle type, and by changes in vegetation such as, for example, a tree changing according to growth patterns over time and according to seasonal changes such as by fall foliage color changes, fall dropping of leaves, and spring leaf growths on trees. Various manipulations may be executed in order to generate vast numbers of image pairs having known correspondence despite having variations. These image pairs with known correspondence may be utilized to train the neural network to be able to generate feature maps from query images and identify correspondence between query image feature maps and reference feature maps. Thus, training can be accomplished without requiring the capture of real images with known correspondence. Capture of real images with known correspondence is cumbersome, time and resource-intensive, and difficult to manage.

Figure 2:
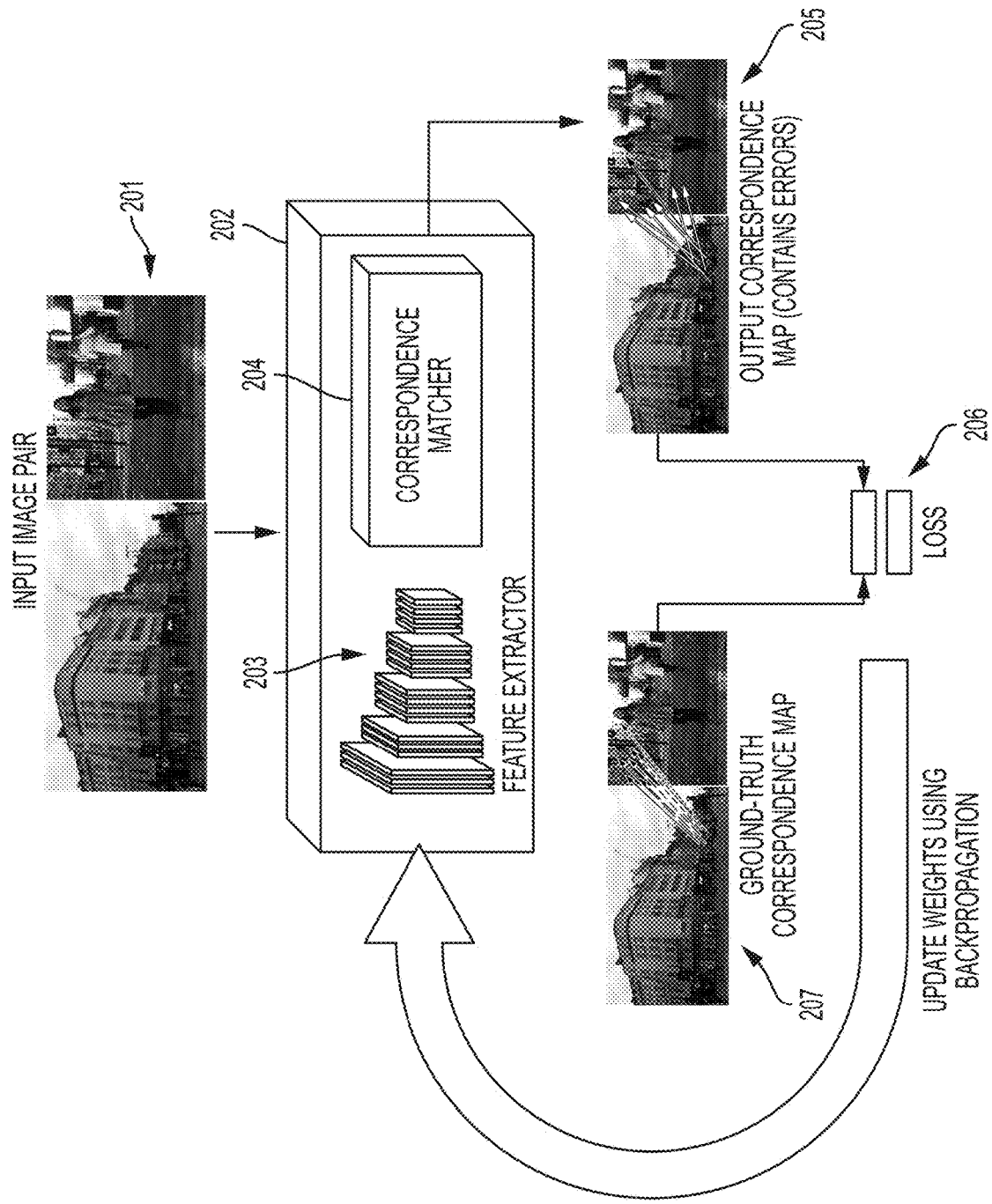
FIG. 2 shows the training of a neural network.

FIG. 2 shows training of the neural network and particularly of the feature extractor 203, which, once trained, can be used as feature extractor 104, 107. Input image pairs 201 may be passed to the integrated neural network 202. The integrated neural network includes a feature extractor 203 and a correspondence matcher 204. The resulting correspondence map 205 may contain errors with respect to a ground-truth correspondence map 207. The error may be quantified using a loss function 206 and the feature extractor 203 and or the feature extractor 203 and correspondence matcher 204 should be updated accordingly. The feature extractor 203 and correspondence matcher 204 may be integrated into a single neural network or the correspondence matcher 204 may be its own neural network or the correspondence matcher 204 may operate without deep learning and training, however such operation may require greater computing resources. When implemented as an integrated neural network or in separate neural networks the feature extractor 203 and correspondence matcher 204 may be updated by updating weights of the feature extractor 203 and correspondence matcher 204, Detailed 3D models of urban environments may be utilized to generate image pairs. The image pairs may be processed to create a ground-truth correspondence for that image pair which can be compared to a correspondence map generated by correspondence matcher 204 from feature maps of each image generated by the feature extractor 203.

A ray-tracing algorithm may be used in a rendering process to provide pixel-accurate correspondence map between two renderings.

Image pairs for use in training may be generated utilizing a 3D model of an urban area augmented with randomly or pseudo-randomly generated occlusions such as vegetation, pedestrians, vehicles, etc. A virtual camera may be placed in a 3D model to simulate the viewpoint conditions achieved by an anticipated query capture system including image capture height, location, limitations, and other parameters such as field of view, exposure, frame rate, etc. Advantageously, camera position may be iteratively moved at fixed distances along a predetermined path, such as dictated by the structure of a virtual road in an urban 3D model by rendering of images for training may be accomplished from multiple camera angles, lenses, exposure models, etc., augmentation with different artificial lighting, weather, and visibility conditions may be applied, and urban occlusions such as cars, vegetation, and pedestrians may be added artificially.

Images used for training are generated by projecting a 3D model on a 2D plane (taking a picture). Therefore, for each point in the image the points in the 3D model that generated it is known. For each such point the exact point of the second 2D image can be determined. In this way, the ground-truth correspondence map 207 can be generated from multiple points on the 3D model and for each one, the set of corresponding points on both images can calculate the ground-truth correspondence map 207.

Enumerating all sets of corresponding points (1 to n) enables creation of a 2D array (also called matrix or a table) which indicates which point corresponds to which point. For example, point 3 in image 1 may correspond to point 4 in image 2—then the correspondence map at row 3 column 4 will be 1. Since point 3 in image 1 doesn't correspond to any other point, row 3 will have zeros in all other columns, this matrix is the ground-truth correspondence matrix.

During training of the neural network correspondence model, the feature extractor is adjusted in a way that the correspondence approximation will be closer to the ground truth correspondence. The loss function indicates a comparison of the feature extraction model and the ground truth model. For each iteration, ray-tracing information may be used to solve pixel correspondence matrix of a designated current image with multiple "neighbor" images.

Figure 3:
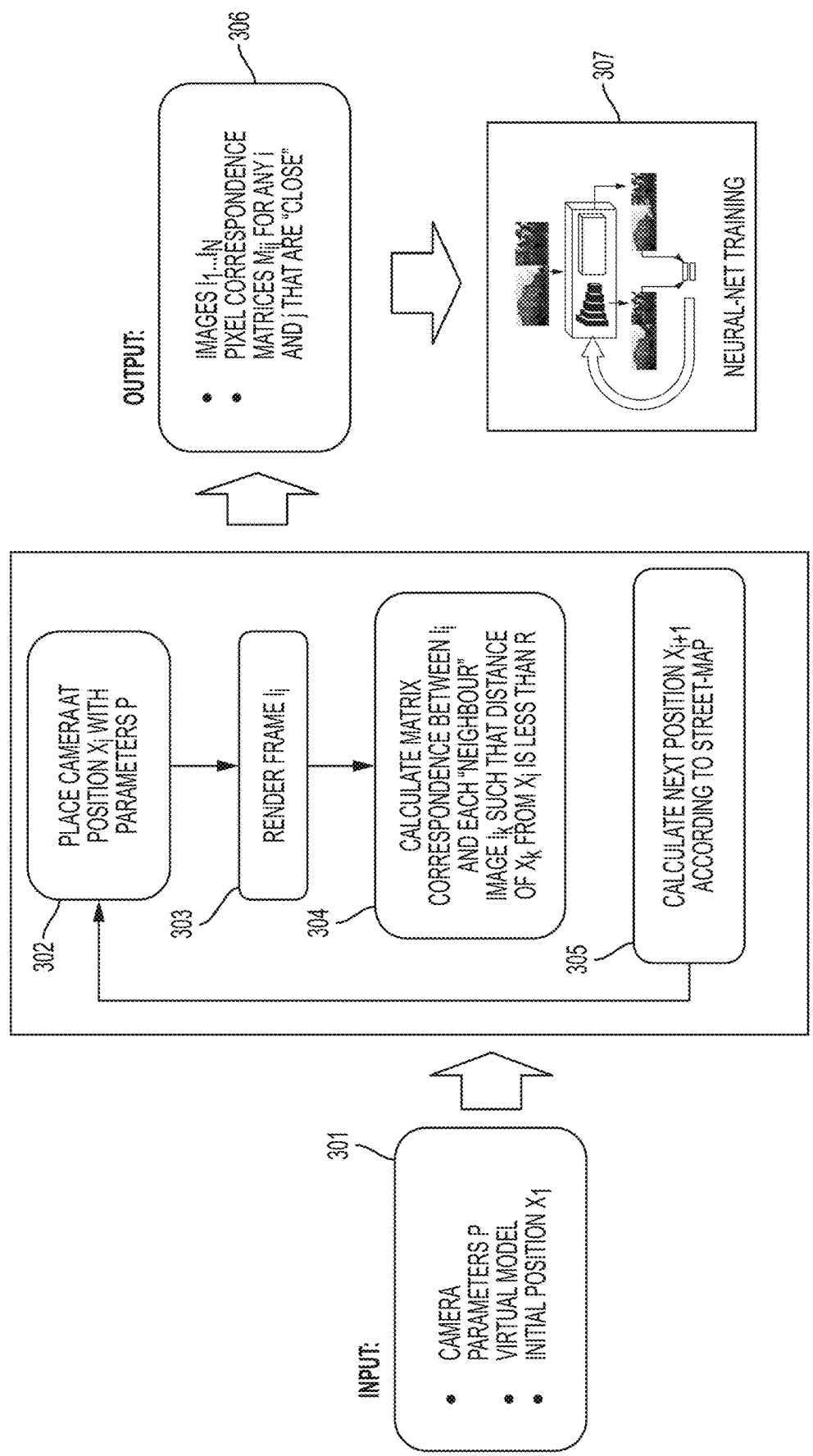
FIG. 3 shows a process flow for neural network training utilizing a 3D city model.

FIG. 3 shows a process flow for neural network training utilizing a 3D city model. The process input 301 may include camera parameters P, the virtual model, and an initial position designated $X_i$. The process begins at 302 whereby a virtual camera is placed at an initial position $X_i$ with parameters P. A frame ii may be rendered at 303. Step 304 involves calculation of matrix correspondence between the initial image $i_i$ and neighbor images $i_k$ such that the distance of $x_k$ from $x_i$ is less than R. R represents a change in distance between a first image of an image pair and a second image of the image pair which is processed. R may represent changes in conditions, location, or perspective, which are sufficiently small to maintain a known correspondence between images separated by R, and R may vary from 0 to an amount whereby the images are sufficiently close to establish correspondence. At 305, the next position $x_{i+1}$ may be calculated, for example, according to a street map, the system may be enhanced where $x_{i+1}$ is calculated according to parameters in addition to location. The process outputs at 306 images $i_1 \ldots 1_n$, and pixel correspondence matrices $m_{ij}$ for any i and j that are "close." These ground truth correspondence matrices are provided to the integrated neural network 307 for training.

The invention is described in detail with respect to preferred embodiments, and it will now be apparent from the foregoing to those skilled in the art that changes and modifications may be made without departing from the invention in its broader aspects, and the invention, therefore, as defined in the claims, is intended to cover all such changes and modifications that fall within the true spirit of the invention.

Thus, specific apparatus for and methods of abstraction of images has been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method for training a neural network implementation of a feature extractor and a correspondence matcher comprising the steps of:
   set rendering parameters in a 3D model wherein said rendering parameters include at least position and orientation;
   rendering a frame according to said rendering parameters to establish a current image;
   processing ray-tracing information of said frame to solve a ground-truth correspondence map of said current image with a neighbor image;
   incrementing said rendering parameters; and
   providing said ground-truth correspondence map as a first training input to said neural network.

2. The method of claim 1 further comprising the steps of:
   processing said current image through a feature extractor to obtain a current feature map;
   processing said current feature map through a correspondence matcher against a feature map derived from said neighbor image to obtain a feature extraction correspondence map;
   providing said feature extraction correspondence map as a second training input to said neural network;
   applying a loss function to said feature extraction correspondence map and said ground-truth correspondence map; and
   updating said feature extractor on the basis of a result of the application of said loss function.

3. The method of claim 2 further comprising the step of updating said correspondence matcher consistent with the step of updating said feature extractor.

4. The method of claim 3 wherein the step of updating said correspondence matcher comprises the step of adjusting weights of said correspondence matcher.

5. The method of claim 4 wherein the step of updating weights of said correspondence matcher by back propagation.

6. The method of claim 2 wherein the step of updating said feature extractor further comprises the step of updating weights of said feature extractor.

7. The method of claim 6 wherein the step of updating weights of said feature extractor is by back propagation.

8. The method of claim 1 wherein said step of incrementing further comprises the step of modifying position.

9. The method according to claim 1 wherein said rendering parameters further comprise light level.

10. The method according to claim 1 wherein said rendering parameters further comprise orientation.

11. The method according to claim 1 wherein said rendering parameters further comprise occlusions.

12. The method according to claim 11 wherein said occlusions further comprise one or more of simulated vegetation, simulated pedestrians, and simulated vehicles.

13. The method according to claim 1 wherein said rendering parameters further comprise a position and orientation corresponding to the position and orientation consistent with the position and orientation of a forward-looking vehicle camera located on a virtual street of said 3D model.

14. The method according to 13 wherein said step of incrementing comprises changing said position and orientation to that [which is] consistent with a forward-looking vehicle camera moved a fixed distance along said virtual street of said 3D model.

* * * * *